United States Patent

Behrend

4,028,625

June 7, 1977

[54] SIDEBAND ANALYZER FOR AM TRANSMITTERS

[75] Inventor: William Louis Behrend, Pittsburgh, Pa.

[73] Assignee: RCA Corporation, New York, N.Y.

[22] Filed: May 5, 1975

[21] Appl. No.: 574,685

[52] U.S. Cl. .......................... 325/133; 324/57 DE; 324/77 C; 358/139

[51] Int. Cl.$^2$ ........................................ H04B 1/02

[58] Field of Search ............ 325/133, 134, 67, 363, 325/329; 324/57 DE, 77 B, 77 C, 83 A; 178/DIG. 4

[56] References Cited

UNITED STATES PATENTS

| | | | |
|---|---|---|---|
| 2,329,625 | 9/1943 | Kentner | 325/133 |
| 2,478,023 | 8/1949 | Hayes, Jr. et al. | 325/134 |
| 2,635,183 | 4/1953 | Smith et al. | 325/133 |
| 2,646,461 | 7/1953 | Grace et al. | 178/5 |
| 2,877,409 | 3/1959 | Jacobsen et al. | 324/57 |
| 2,930,891 | 3/1960 | Lakatos | 325/329 |
| 2,952,770 | 9/1960 | Downie | 325/133 |
| 3,241,059 | 3/1966 | Wu | 324/57 |
| 3,337,804 | 8/1967 | Palatinus | 325/133 |

*Primary Examiner*—Benedict V. Safourek
*Assistant Examiner*—Marc E. Bookbinder
*Attorney, Agent, or Firm*—Edward J. Norton; Robert L. Troike

[57] ABSTRACT

A measurement of the group delay and the amplitude response of the upper and lower sidebands of a transmitter is provided by amplitude modulating with a tone a video signal that modulates the transmitter carrier. The frequency of the video signal is changed to provide a search or coverage over the frequency bands of the upper and lower sidebands. A mixing and frequency selection are performed at the transmitter RF output to select a particular upper and lower sideband. An envelope detector demodulates the tone that is amplitude modulated on the selected sideband signal. The amplitude of this detected signal is indicative of the amplitude response and the phase of the detected signal relative to a reference phase is indicative of the group delay at the selected sideband signal.

8 Claims, 1 Drawing Figure

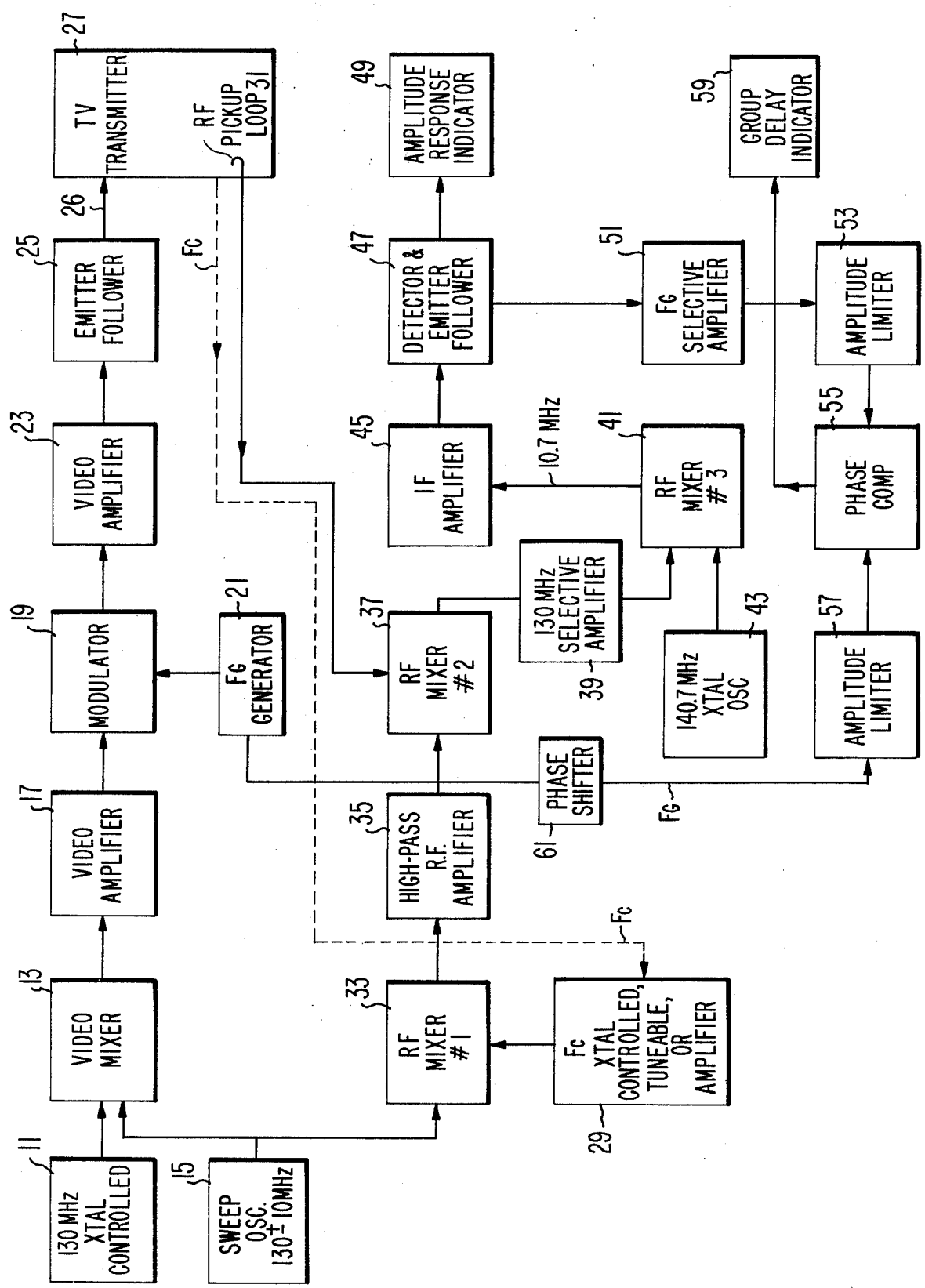

SIDEBAND ANALYZER FOR AM TRANSMITTERS

BACKGROUND OF THE INVENTION

This inventon relates to a sideband analyzer for amplitude modulation transmitters and more particularly to the measurement of sideband amplitude response and/or sideband group delay response of such transmitters capable of broadcasting television.

The present method for measuring the performance of television transmitters is to measure the video-in to video-out group delay characteristic. A tone is modulated onto a video sinewave signal, and this signal is applied to the transmitter under test. An envelope detector detects the tone from the output of the transmitter under test, and the detected tone is applied to a phase meter. The original tone is applied through a phase shifter to the phase meter. The phase shifter adjusts the phase of the reference tone signal at some reference video frequency such as 200 KHz (kilohertz) to zero phase relative to the phase of the demodulated tone signal. This adjusts out any average phase shift through the unknown circuit, and the group delay is then measured relative to that at the reference video frequency (group delay at reference video frequency is taken at zero). A fault in this measurement is that the group delay characteristic over the lower sideband region and the upper sideband region is not measured. A composite effect of both sidebands is measured. Also, included in the measurement are the effects of the vestigial amplitude response slope of te RF demodulator, and the overall phase characteristic of the RF demodulator.

BRIEF DESCRIPTION OF THE INVENTION

Briefly, a sideband analyzer for amplitude modulation transmitters is provided by amplitude modulating a given frequency signal with a tone frequency. The amplitude modulated given frequency signal is applied to an amplitude modulation transmitter producing both upper and lower sideband signals. A sideband selector is provided for sequentially selecting separated sideband signals. A detector coupled to the selector detects the tone on the selected sideband signal. The amplitude of the detected tone indicates the amplitude response of the transmitter at that then selected sideband frequency, and the phase of the tone when compared to a reference phase provides an indication of the group delay response of the transmitter at the selected sideband frequency.

DETAILED DESCRIPTION

A detailed description follows in conjunction with the following drawing which is a block diagram of a television sideband group delay and amplitude response analyzer according to one embodiment of the present invention.

Referring to the drawing, a crystal controlled oscillator 11 for a television transmitter analyzer system applies a fixed video frequency signal F1 of 130 MHz to a first mixer 13. A sweep oscillator 15 applies a frequency which sweeps from 120 MHz to 140 MHz (130 $\pm$ 10 MHz) at a rate of 1/10th of a second for example. The sweep width would depend on the bandwidth of the TV system to be measured. A frequency sweep from 125 MHz to 135 MHz would be used for many TV system measurements. The sweep width of 20 MHz is selected in the arrangement described herein since sideband frequencies 10 MHz above or below the carrier frequency may be of interest in a television system or in a double sideband system. The difference signal at mixer 13 is provided to video amplifier 17. This video signal from mixer 13 sweeps from 10 MHz to zero to 10 MHz. The amplified sweeping signal of 10 MHz to zero to 10 MHz from the amplifier 17 is amplitude modulated at modulator 19, with a fixed frequency tone $F_g$ from generator 21. This tone $F_g$ may be 20 KHz for example. The amplitude modulated signal from modulator 19 is raised at a video amplifier 23 to a sufficiently high level to be processed by the television transmitter 27 under test. The amplified amplitude modulated signal is applied through emitter follower 25 and lead 26 to television transmitter 27. The emitter follower 25 is arranged so that the signal on lead 26 matches the transmitter input impedance. After processing the signal through the unknown transmitter circuit 27, the signal is amplitude (AM) modulated to a carrier signal Fc. The AM signal applied to the transmitter may be represented as $$\cos \omega_v t + (m_1/2) \cos (\omega_v t - \omega_g t) + (m_1/2) \cos (\omega_v t + \omega_g t),$$

where $F_v$ is the search frequency and $\omega_v$ is $2\pi F_v$ and $F_g$ is the tone frequency, and $\omega_g$ is $2\pi F_g$ $m_1$ is the modulation factor on the search signal by the tone signal The signal out of the transmitter is picked up by a coupling loop 31 and is applied to RF mixer 37. The transmitter output signal with the carrier component normalized to one modulation factor $m_2$ may be represented by:

$$\cos \omega_c t \left\{ 1 + m_2 \left[ \cos \omega_v t + \frac{m_1}{2} \cos (\omega_v t + \omega_g t) + \frac{m_1}{2} \cos (\omega_v t - \omega_g t) \right] \right\}$$

where $F_c$ is the carrier frequency and $\omega_c$ is $2\pi F_c$, $m_2$ is the modulation factor on the carrier signal by the test signal.

A source of carrier signals at the carrier frequency $F_c$ may be provided by source 29. The source 29 may be a crystal controlled source, a tunable oscillator controlled by a signal coupled from the transmitter 27, or may be an amplifier for the carrier signals $F_c$ provided by the transmitter 27. The signals at Frequency $F_c$ are applied from source 29 to an RF mixer 33. The sweep frequency signals of 120 MHz to 140 MHz from sweep oscillator 15 are also applied to mixer 33. The mixed signals at mixer 33 are amplified and passed through high pass filter 35 and applied to mixer 37. The high pass filter 35 is selected to pass the sum term of $F_c$ + 130 $\pm$ 10 MHz. This high pass filter 35 may, for example, be a nine section, 0.01 db maximum ripple Chebyshev-type filter. This signal of $F_c$ + 130 MHz $\pm$ 10 MHz from filter 35 is mixed at mixer 37 with the RF signal coupled from the transmitter output viz loop 31 which may be represented as $F_c \pm$ (10 MHz to 0 to 10 MHz) $\pm F_g$. A selective filter 39 coupled to the output of mixer 37 passes 130 MHz, 130 MHz + $F_g$ (tone) and 130 MHz − $F_g$ (tone) to mixer 41. As the sweep oscillator 15 scans from 120 to 140 MHz, the signal at frequencies $F_c$ + 120 to $F_c$ + 140 is mixed with the signals at frequencies $F_c - 10$ MHz $\pm F_g$ to $F_c$ to $F_c + 10 \pm F_g$ MHz and the transmitting system lower and then upper sidebands are tracked at a constant frequency $F_k$ of 130 MHz. At the low end of the sweep (the low end of the lower sideband being swept) the 130 MHz signal is being coupled to mixer 41 due to the mixing at mixer 37 of the $F_c + 120$ MHz frequency signal from filter 35 and the $F_c - 10$ MHz frequency signal from the transmitter 27. At the middle of the sweep where the $F_c + 130$ MHz frequency signal is mixed with to $F_c + 0$ frequency signal, the central carrier of 130 MHz is being coupled to mixer 41. At the high end of the sweep (upper end of the upper sideband), the $F_c + 140$ MHz frequency signal is mixed at mixer 37 with $F_c + 10$ MHz frequency signal from the transmitter 27 and the difference signal of 130 MHz is coupled to mixer 41. The frequencies given for the extreme lower and upper sidebands would not be available for some TV systems, such as at the output of a vestigial sideband filter for a typical U.S. television system or C.C.I.R. System M. Lower sidebands of interet may be from carrier to 0.75 MHz below carrier. At the sideband 0.75 MHz below carrier the frequencies would be: $F_c + 129.25$ MHz signal from filter 35 and $F_c - 0.75$ MHz signal from the transmitter 27. Upper sidebands of interest may be from carrier to 4.2 MHz above carrier. At the sideband 4.2 MHz above carrier the frequencies would be: $F_c + 134.2$ MHz mixed with $F_c + 4.2$ MHz. The constant frequency signal of 130 MHz is AM modulated with the $F_g$ tone signal and the upper and lower tone signal $F_g$ sidebands are phase shifted relative to the 130 MHz the same amount as the tone signal sidebands are phase shifted relative to the transmitter video sidebands. The phase of the signal at the output of the high pass RF filter 35 has no effect as the phase angle is transferred the same to the 130 MHz signal and its sidebands.

Crystal oscillator 43 applies 140.7 MHz signals to RF mixer 41. A 10.7 MHz difference signal is coupled out of the mixer 41 and applied to IF amplifier 45. The amplified output from the IF amplifier 45 is applied to detector 47 and the tone signal at $F_g$ is detected. One of the outputs from the detector 47 is an amplitude response indicator. As the sweep oscillator sweeps signals from 120 to 140 MHz, for example the indicator 49 indicates the amplitude responses of the detected envelope over the lower to upper sidebands. The indicator 49 could be a meter or an oscilloscope with the sweep circuit controlled by oscillator 15.

Also at the output of detector 47 is a selective filter 51 which is adapted to pass the detected tone signal of $F_g$. The detected tone signal at $F_g$ from detector 47 is passed through an amplitude limiter 53 and is applied to a phase comparator 55. A tone signal $F_g$ from the tone generator 21 is also applied to the phase comparator 55 through a separate amplitude limiter 57. The amplitude limiters 53 and 57 are arranged to provide substantially equal gain tones to the comparator 55. A phase shifter 61 is coupled between the generator 21 and limiter 57 to adjust out the average delay in the system. The detected phase difference provides the upper sideband and lower sideband group delay characteristics of the system. This phase difference is coupled to a group delay indicator 59. The indicator 59 may be an oscilloscope which is scanned by the signals from the sweep oscillator 15 with the phase difference at the phase comparator 55 providing an amplitude response proportional to the phase difference. This amplitude varying signal is applied to the oscilloscope.

The following is a mathematical analysis of how the phase of the detected tone signal $F_g$, indicates th group delay.

Group delay is defined as $$T_g = (d\theta/d\omega) \approx (\Delta\theta/\Delta\omega)$$

where $\Delta\theta$ is phase shift in radians
$\Delta\omega$ is a frequency increment of radians per second
The phases, in radians, of the tone frequency sidebands relative to the search frequency phase are:

$$\theta_{f_v + f_x} - \theta_{f_v} \text{ (phase of upper tone sideband)}$$

and $$\theta_{f_v} - \theta_{f_v - f_x} \text{(phase of lower tone sideband)}$$

where, $$\theta_{f_v + f_x} - \theta_{f_v} \approx \theta_{f_v} - \theta_{f_v - f_x} \approx \theta_{f_x}$$

where, $\theta_{f_x}$ is the phase in radians of the detected tone signal, $f_g$ and $\theta_{f_v}$ is the phase in radians of the search frequency $f_v$, $$\Delta f = (f_v + f_g) - (f_v - f_g) = 2 f_g$$

$$\Delta\theta \approx 2 (\theta_{f_v} - \theta_{f_v - fg} = 2\theta_{f_x}$$

$$T_g = \frac{\Delta\theta}{\Delta\omega} = \frac{2\theta_{f_g}}{2\pi (2f_g)} = \frac{\theta_{f_g}}{2\pi f_g}$$

As $F_g$ is a constant frequency the phase indicator can be calibrated in group delay.

What is claimed is:
1. An anayzer for measuring the sideband response of an amplitude modulation transmitter under test over a predetermined band of frequencies comprising:
   means for generating first and second frequency scan signals, the frequencies scanned over the same time period equalling said predetermined band of frequencies,
   tone generator means for generating a tone,
   first means responsive to said first frequency scan signal and said tone for amplitude modulating said first frequency scan signal with said tone,
   coupling means for applying said first frequency scan signal amplitude modulated with said tone to said transmitter under test to produce transmitted sideband signals at sequentially changing sideband frequencies,
   pick-up means to extract the modulated radio frequency signals from said transmitter,
   second means including a mixer and frequency selector coupled to said pick-up means and additionally responsive to said second frequency scan signal for sequentially and individually providing at a fixed frequency said transmitted sideband signals as said second frequency scan signal scans said predetermined band of frequencies, and means including a tone detector coupled to said second means and responsive to the transmitted sideband signals at said fixed frequency for detecting the response of said tone amplitude modulated on the individual sidebands to thereby measure the individual sideband response of said transmitter under test.

2. The combination of claim 1 wherein said means for detecting the response of said tone further includes means coupled to said tone detector for indicating the amplitude response of said tone.

3. The combination of claim 1 wherein said means for detecting the response of said tone further includes reference tone means coupled to said tone generator means for providing a reference tone and means coupled to said reference tone means and said tone detector for comparing said reference tone with said detected tone to measure the group delay introduced by the transmitter at the individual sideband frequencies.

4. A testing apparatus for measuring the group delay introduced by an amplitude modulation transmitter under test comprising:

scanning frequency generating means for generating first and second frequency scan signals with said first frequency scan signal scanning from frequency $f_L$ to 0 to $f_u$ over a given time period and said second frequency scan signal scanning from $f_1 - f_L$ to $f_1$ to $f_1 + f_u$ over said given time period, where $f_1$ is a fixed given frequency, $f_L$ equals the maximum measured deviation frequency below the transmitter carrier frequency and $f_u$ equals the maximum measured deviation frequency above the transmitter carrier frequency, tone oscillator means for generating a tone signal $f_o$, means coupled to said scanning frequency generating means and said tone oscillator means for amplitude modulating said first frequency scan signal with said tone signal, coupling means for applying said first frequency scan signal amplitude modulated with said tone signal to said transmitter under test whereby said first frequency scan signal is amplitude modulated to the carrier frequency of said transmitter producing sequentially over said given time period at the output of said transmitter lower and upper sideband signals at frequencies from a maximum of $f_L + f_o$ to 0 on either side of said transmitter carrier frequency and lower and upper sideband signals at frequencies from 0 to $f_u + f_o$ on either side of said transmitter carrier frequency, pick-up means to extract the modulated radio frequency waves from said transmitter, means including a mixer and a frequency selector coupled to said pick-up means and coupled to said frequency generating means and responsive to said sideband signals from said transmitter and to said second frequency scan signal for over said given time period providing individually and sequentially at a fixed frequency $f_k$ said sideband signals at frequencies from a maximum of $f_L + f_o$ to 0 below said carrier frequency and from 0 to $f_u + f_o$ above said carrier frequency as said second frequency scan signal scans from frequencies $f_1 - f_L$ to $f_1$ and from $f_1$ to $f_1 + f_u$, reference tone generation means coupled to said tone oscillator means for providing a reference tone $f_r$, tone detector means coupled to the output of said mixing and selector means for detecting the tone on each of said sideband signals, and means coupled to said reference tone generation means and tone detector means for comparing the phase of said detected tone to said reference tone to thereby measure the group delay introduced by said transmitter at the individual sideband frequencies.

5. The combination of claim 4 wherein said scanning frequency generating means includes a single scanning frequency oscillator.

6. The combination of claim 4 wherein said frequency $f_1$ is equal to said transmitter carrier frequency plus said fixed frequency $f_k$ at the output of said mixing and selector means.

7. The combination of claim 4 wherein said frequencies $f_L$ and $f_u$ are equal.

8. An analyzer for measuring the sideband response of an amplitude modulation transmitter under test comprising:

means for generating first and second frequency scan signals with the first frequency scan signal scanning from a frequency $f_L$ to zero to $f_u$ over a given time period and the second frequency scan signal scanning from $f_1 - f_L$ to $f_1$ to $f_1 + f_u$, where $f_1$ is a given fixed frequency and $f_L$ equals the maximum measured deviation frequency below the transmitter carrier frequency and $f_u$ equals the maximum measured deviation frequency above the transmitter carrier frequency, means for coupling said first frequency scan signal to said transmitter under test to modulate said transmitter therewith and produce transmitted sideband signals at sequentially changing sideband frequencies, first pick-up means to extract the modulated signals from said transmitter, second pick-up means to extract signals representing the transmitter carrier frequency from said transmitter, local means coupled to said second pick-up means for providing signals at the transmitter carrier frequency, first local mixing and filtering means coupled to said local means for providing the transmitter carrier frequency signal and additionally responsive to said second frequency scan signal for mixing said second frequency scan signal with said locally generated transmitter carrier frequency signals and filtering to provide third frequency scan signals scanning from $f_1 - f_L$ to $f_1 + f_u$ above said transmitter carrier frequency, second local mixing and filtering means including a mixer and frequency selector coupled to said first pick-up means and said first local mixing and filtering means for sequentially and individually providing for analysis at a fixed frequency said transmitted sideband signals, means coupled to said second local mixing and filtering means and responsive to the transmitted sideband signals for detecting the amplitude response of said sidebands.

* * * * *